(12) United States Patent
Palm

(10) Patent No.: US 6,779,180 B1
(45) Date of Patent: Aug. 17, 2004

(54) APPARATUS AND METHOD FOR PREVENTING STACK OVERFLOW FROM SYNCHRONOUS COMPLETION OF ASYNCHRONOUS FUNCTIONS

(75) Inventor: Jeffrey William Palm, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/154,491

(22) Filed: Sep. 16, 1998

(51) Int. Cl.[7] .................................................. G06F 9/00
(52) U.S. Cl. ...................................... 718/100; 718/102
(58) Field of Search ................................ 709/230, 107, 709/108, 103, 100; 718/100, 102

(56) References Cited

U.S. PATENT DOCUMENTS 5,987,517 A * 11/1999 Firth et al. .................. 709/230
6,293,712 B1 * 9/2001 Coutant ....................... 395/704
6,314,513 B1 * 11/2001 Ross et al. ................... 712/228

* cited by examiner

*Primary Examiner*—Thomas Lee
*Assistant Examiner*—The Thanh Ho
(74) *Attorney, Agent, or Firm*—Schmeiser, Olsen & Watts; Leslie J. Payne

(57) ABSTRACT

A stack unwinding mechanism and method for same is presented. The stack unwinding mechanism reduces stack overflow problems by determining if an asynchronous function completed synchronously and unwinding the stack if the function did complete synchronously. The stack unwinding mechanism then completes the client's processing of the asynchronous function's task after the stack has been unwound. This allows client processing to take place when there is little chance of stack overflow or overgrowth. If the asynchronous function will complete asynchronously, the stack unwinding mechanism allows processing to continue normally because there is little chance for stack overflow in this situation. The various embodiments of the present invention disclosed herein are especially well-suited to embedded processor environments.

55 Claims, 11 Drawing Sheets

← 700

```
ClientFunct( )
    ( )
    ( )
    ( )
    test_flag = TRUE              // initialize boolean flag to TRUE SubsysFunct( )                // call the asynchronous subsystem
    if (test_flag == TRUE){       // subsystem will complete
                                  // asynchronously
        test_flag = FALSE         // set flag to FALSE
    }
    else {                        // subsystem completed synchronously
        ClientCallback( )         // call the callback function directly
    }
return ClientCallback( )

if (test_flag ==TRUE){        // subsystem completed synchronously
        test_flag = FALSE         // set flag to FALSE
    }
    else {                        // stack is unwound ... proceed
        ( )
        ( )
        ( )
    }
return
```

FIG. 8

APPARATUS AND METHOD FOR PREVENTING STACK OVERFLOW FROM SYNCHRONOUS COMPLETION OF ASYNCHRONOUS FUNCTIONS

BACKGROUND OF THE INVENTION

1. Technical Field

This invention generally relates to computer system resource management and more specifically relates to memory management in a multi-threaded programming environment.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computers have increased, the application programs designed for high performance computer systems have become extremely powerful.

As a computer system is utilized to accomplish the various tasks for which it was designed, it uses an electronic memory storage area in order to perform the necessary calculations and manipulations associated with the processes at hand. The "stack" is a dedicated portion of the computer system's memory storage area used by the computer system to store the state of the computer system, to pass variables between functions, and to store return addresses so that the system can return to its original location before function calls. Thus, the stack serves as a temporary storage location where the computer can place interim information while performing various processing operations. As a part of the processing associated with the normal operations of the computer system, the computer system will issue "function calls" for various procedures. Whenever the system calls a function as part of accomplishing a task, the current state of the computer (if needed), a return address, and variables being passed to and from the function are placed into an area of the stack known as a "stack frame" and placed onto the stack for use by the system.

Because computer systems are designed in a multitude of different ways, stacks are also implemented in several ways. Portions of an operating system, which control most computer systems these days, may use more than one stack. Furthermore, stacks can be implemented in a fixed size, wherein stacks can only grow so large, or stacks can be implemented in an "infinite" size, wherein stacks can use hard drive or other space to grow until the hard drive or other space is completely full. If the size of the stack is fixed, care must be exercised so as not to exceed the boundaries of the stack. If more stack frames are placed onto the stack than can be accommodated within the preestablished limits of the stack, then the stack "overflows" and the entire system can crash as the instructions stored on the stack overwrite other areas of the computer system's memory storage area. This type of memory error will commonly cause loss of data and other significant problems. In addition, some systems will completely and irretrievable lock if the stack is overflowed. Most systems will, at a minimum, generate stack exceptions. Even those systems that have an infinite stack will suffer a performance hit if the stack grows too large because most of the stack will be on the hard disk, and hard disks are substantially slower than memory.

As a general rule, each different function call, processed during the computer's normal operation, will generate a stack frame that will be placed on the stack for eventual removal by the computer system. One function call generally creates one stack frame on the stack and 10 function calls will generate 10 stack frames on the stack. If too many function calls are made and too many stack frames are generated, the stack frames can exceed the logical limits of the stack boundaries and overrun the limits of the stack portion of the memory as described above. Furthermore, even if the stack size is not fixed, the system will suffer a serious performance hit because the stack will be paged into and out of disk memory.

These stack overflow errors are possible when an asynchronous function, particularly a subsystem function, completes its task "synchronously." In this scenario, a system would ask a subsystem function to perform a task by calling the function and handing it a variable that indicates what task is to be performed. The system will also generally pass a callback entry point (the address of a callback function) to the subsystem function. The callback entry point acts as a notice to the subsystem that the subsystem needs to call the system back when the task has been completed, and that the subsystem should call a particular callback function that is pointed to by the callback entry point. A stack frame is placed on the stack with the call to the subsystem function. The subsystem knows that it can immediately complete its task, and it does so. This completion is termed "synchronous" because the task was completed in the same computer state. The subsystem may call other sub-functions or subsystems that help it complete the task. Each of these sub-functions will generally result in stack frames being placed on the stack. Some of these stack frames may still be on the stack when the subsystem function calls back the system by calling the callback function. This is particularly true if a sub-function of the subsystem function performs the call to the callback function, because the call to the sub-function will generate another stack frame. The callback function causes yet another stack frame to be placed on the stack.

Therein lies the potential stack problem. There are many stack frames on the stack, and the stack has not had a chance to "unwind." Unwinding, also called unwrapping, a stack is basically the process of allowing the system to "catch up" to the multitude of stack frames on the stack. Functions are returned from and each return unwinds or unwraps the stack by removing the stack frame, associated with the function being return from, off the stack. For instance, if no more functions are called at this point in the scenario, normal processing would incur a return from the callback function, returns from all of the sub-functions called by the subsystem, and a return from the subsystem function. The stack would then be at its starting point. The problem arises when these multiple frames are on the stack and more calls to similar subsystems or the same subsystem occur. Or, if a function is looping through a repetitive series of similar asynchronous function calls that complete in a synchronous fashion, it is quite possible that the accumulated callback functions can quickly cause the stack to overflow. This looping causes a problem because each call to an asynchronous function that completes synchronously causes more stack frames to be placed on the stack, with no opportunity to unwind the stack. This looping can happen, for example, if large amounts of data are being moved from a disk drive to memory.

There are several possible solutions to this stack dilemma known to those skilled in the art. For example, it is possible to have the system treat every function call in the same manner and wait for the task to be completed before processing the next function call. While ensuring that the stack will not overflow, this approach is extremely inefficient from a processing point of view. Alternatively, it is possible to create an "infinite stack," where the size of the stack can grow as large as necessary. As explained previously, this solution is also inefficient because system performance will deteriorate as the size of the stack increases. At present, a system must either operate without adequate stack overflow protection or operate with inefficient processing restraints which are counterproductive in today's demanding computer-based business environment.

Therefore, there exists a need for a more acceptable stack overflow protection system. Without an improved mechanism for monitoring and managing the stack to prevent undesirable overflows, systems will continue to suffer from artificial processing limitations or unnecessary exposure to stack overflows and the concomitant system crashes that accompany this situation.

DISCLOSURE OF INVENTION

According to the preferred embodiments of the present invention, a stack unwinding mechanism is provided that reduces stack overflow problems by determining if an asynchronous function completed synchronously and unwinding the stack if the function did complete synchronously. The stack unwinding mechanism then completes the client's processing of the asynchronous function's task after the stack has been unwound. This allows client processing to take place when there is little chance of stack overflow or overgrowth. If the asynchronous function will complete asynchronously, the stack unwinding mechanism allows processing to continue normally because there is little chance for stack overflow in this situation. By providing stack management for asynchronous function calls that complete synchronously and by unwinding the stack, the stack unwinding mechanism reduces the chances of stack overflow from synchronous completion of asynchronous functions. The various embodiments of the present invention disclosed herein are especially well-suited to embedded processor environments.

BRIEF DESCRIPTION OF THE DRAWINGS

FIG. 8 contains the sample code segments required to implement a stack unwinding mechanism according to the preferred embodiments of the present invention;

BEST MODE FOR CARRYING OUT THE INVENTION

Figure 1:
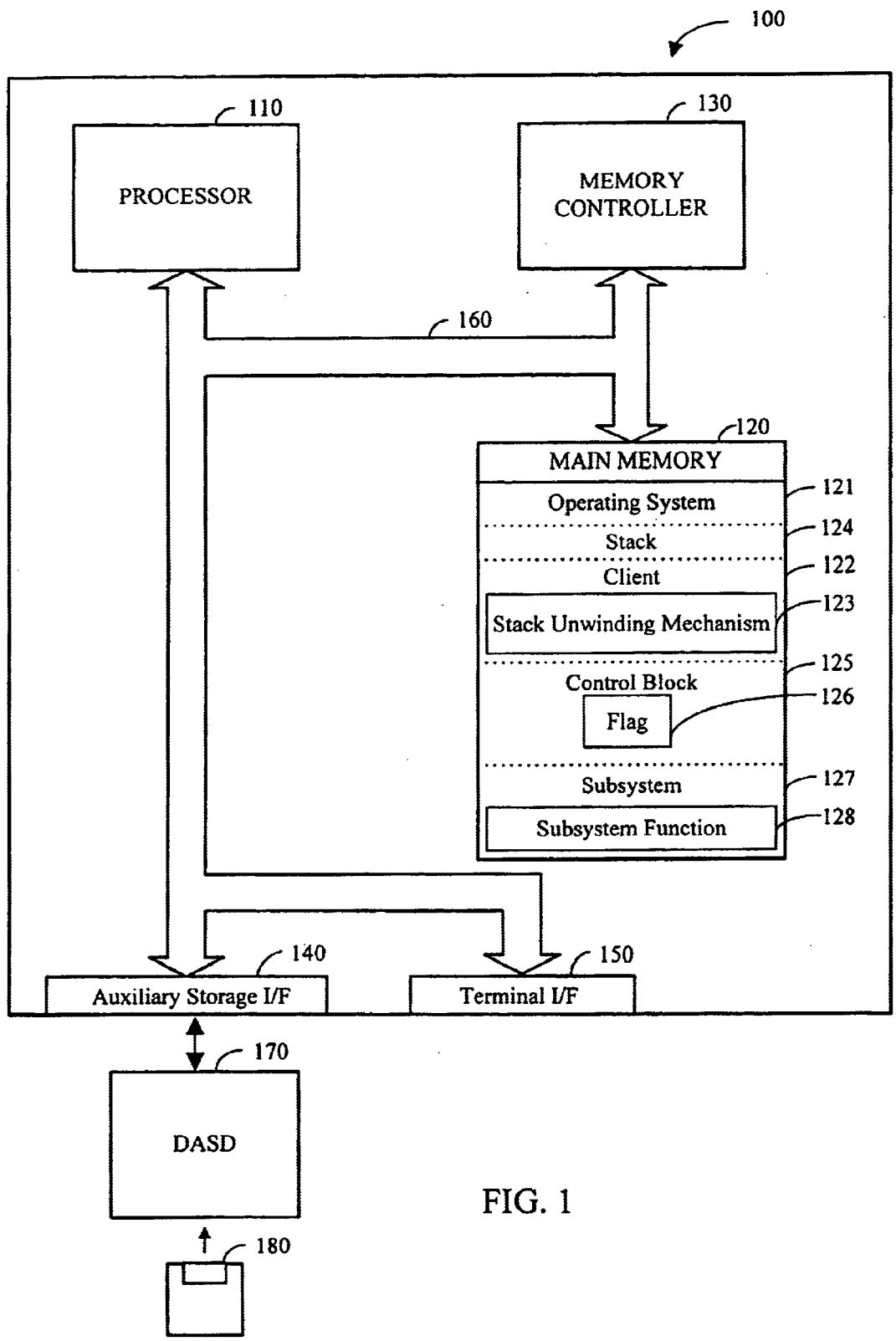
FIG. 1 is a block diagram of an apparatus according to a preferred embodiment of the present invention.

The present invention relates generally to asynchronous functions and subsystem call and call back programming models. In addition, although the invention is not limited to multi-threaded environments, the invention is particularly well suited to multi-threaded operating systems. For those individuals who are not generally familiar with these subjects, the Overview section below presents many of the concepts that will help to understand the invention. Individuals skilled in the art of asynchronous functions, subsystem call and call back programming models, and multi-threaded operating systems may wish to skip the Overview section and proceed directly to the Detailed Description section of this specification.

1. Overview
Synchronous/Asynchronous Functions and Subsystem Call/Callback Models Function calls may be broadly categorized into two separate classes. These classes are based on the system context of the completed function. Basically, if a function can complete a particular task while only being called once (e.g., in one thread of operation), then the function has operated in one system context. If, however, a function cannot complete a particular task without being called or running again (e.g., in a second thread of operation), then the function will complete the task in a different context.

Functions that complete a particular task in the same system context are called "synchronous" functions. Synchronous functions are functions which, when called, execute the requested task and then immediately return to the system in the same context in which the function call was made. The system knows in advance that the task will be completed immediately. This means that there is no need for the system to wait for input/output or other processing; the function simply executes and returns on a single function call. For example, performing a math calculation is a synchronous function because the math calculation will complete in the same system context (often immediately), and the system does not have to worry about when the calculation will take place.

In the other category, and the category with which the preferred embodiments of the present invention are concerned, there are certain functions which will require an unknown amount of time to process and the system will not know in advance how long the function will need to complete the requested task. These types of functions are known as "asynchronous" functions. An asynchronous function is any function which, after being called the first time, will complete the requested task at some unknown time in the future. For purposes of maintaining efficiency, the typical system will issue an asynchronous function call and then begin to process other tasks while the asynchronous task is completed.

Asynchronous functions can also be split into two broad categories. These categories describe the actual manner in which the asynchronous function completed. Asynchronous functions can complete in either an asynchronous or synchronous manner. Even though the system will think that the asynchronous function will complete at some time in the future, during certain situations asynchronous functions can complete their tasks in a very short time and while in the same system context. These situations are referred to as having an asynchronous function complete synchronously. Similarly, many situations will entail the asynchronous function's being unable to complete its tasks until some later time and while in a different system context. These situations are referred to as having an asynchronous function complete asynchronously.

For example, if the system requests a certain block of information from a memory location, the system does not know how long it will take to retrieve the requested information. If the requested information is readily available, perhaps residing in the quickly accessible cache memory, then the memory subsystem can complete the function almost immediately and return the requested information to the system. The subsystem will then call back the system to tell the system that it has performed its task. The subsystem, thus, is an asynchronous function that completed synchronously. If, on the other hand, the requested information is not immediately available in the cache memory, then the function must initiate the process of reading the desired information from main memory or, perhaps from a hard disk drive or other secondary storage location. After the information has been retrieved, the function will issue a callback function to the system, thereby alerting the system of the availability of the requested information. Since some amount of time will have passed since the system made the request for the information, the callback function will occur in a different processing context or processor state. In multi-threaded systems, the different processing context will mean that the callback function will occur on a different thread. The subsystem in this instance is an asynchronous function that completed asynchronously.

It should be noted that, in the case of the asynchronous function described above, the system has no way of knowing whether the desired information is immediately available or not at the time the system requests the desired information. The system is, however, aware that the function is an asynchronous function and that some unknown amount of time will be required to complete the requested task.

When the system calls a subsystem to complete a task, such as retrieving information from a hard disk, the system generally passes the address of a "control block" to the subsystem. The system places all necessary information into a control block so that the subsystem can complete the task handed to it. The control block will contain such information as the address of the callback function, so that the subsystem can call back the system when the shared resource has been accessed and the information retrieved. In addition, other parameters are placed into the control block, such as what information is to be retrieved from the shared resource, which shared resource is to be accessed (e.g., hard drive or compact disk), and any other necessary information that the subsystem needs to process the command. If the subsystem cannot immediately complete the command, the subsystem will generally place the address of the control block into a queue. The subsystem will then return to the system, will run again at some later time, and will process the various control blocks on its queue when it is the subsystem's time to run again. Generally, the subsystem regains control through an interrupt handler that initiates completion of the subsystem task. The subsystem then calls back the system at the indicated callback function. This callback occurs in a thread or context different from that of the original call by the client to the subsystem.

A subsystem is a logical collection of functions, object, and data whose mission can be encapsulated and segregated from the rest of the system. Subsystems tend to be quite complex. They generally have several sub-functions and can actually call other subsystems. These sub-functions and other subsystems may place additional frames on the stack that may still be on the stack while the original subsystem is still running.

In addition, subsystems tend to use shared resources such as disk drives that may take a while to respond to commands from the subsystem or that may be in use by another subsystem. Thus, subsystems are generally asynchronous functions. The subsystem call and callback model was developed to handle these types of resources (and their concomitant asynchronous function calls) that may not be available or respond for some time. The call and callback model is efficient because it allows the system to inform the subsystem that it has a task to perform, yet the system can go about other business until the subsystem can actually complete the task and notify the system. The system can then complete its portion of the task, such as moving data from the subsystem and into memory. Without the call/callback model, the system would have to wait until the subsystem completed its task. In today's systems, this would be incredibly inefficient because many tasks, in particular reading from or writing to hard drives, printers, compact disks, etc., can take a relatively long amount of time.

Figure 9:
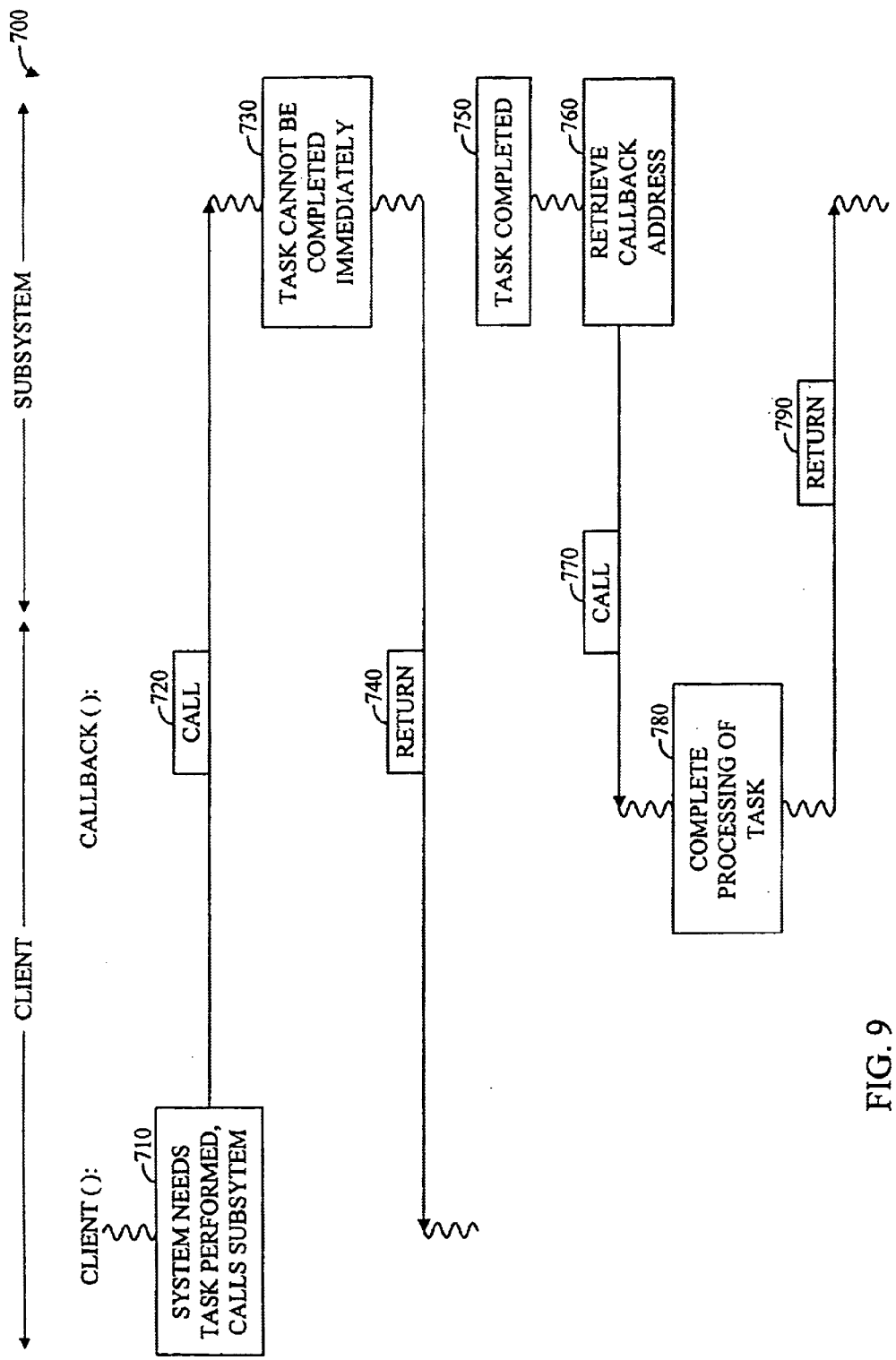
FIG. 9 is a flow diagram depicting asynchronous completion of an asynchronous function.
Figure 10:
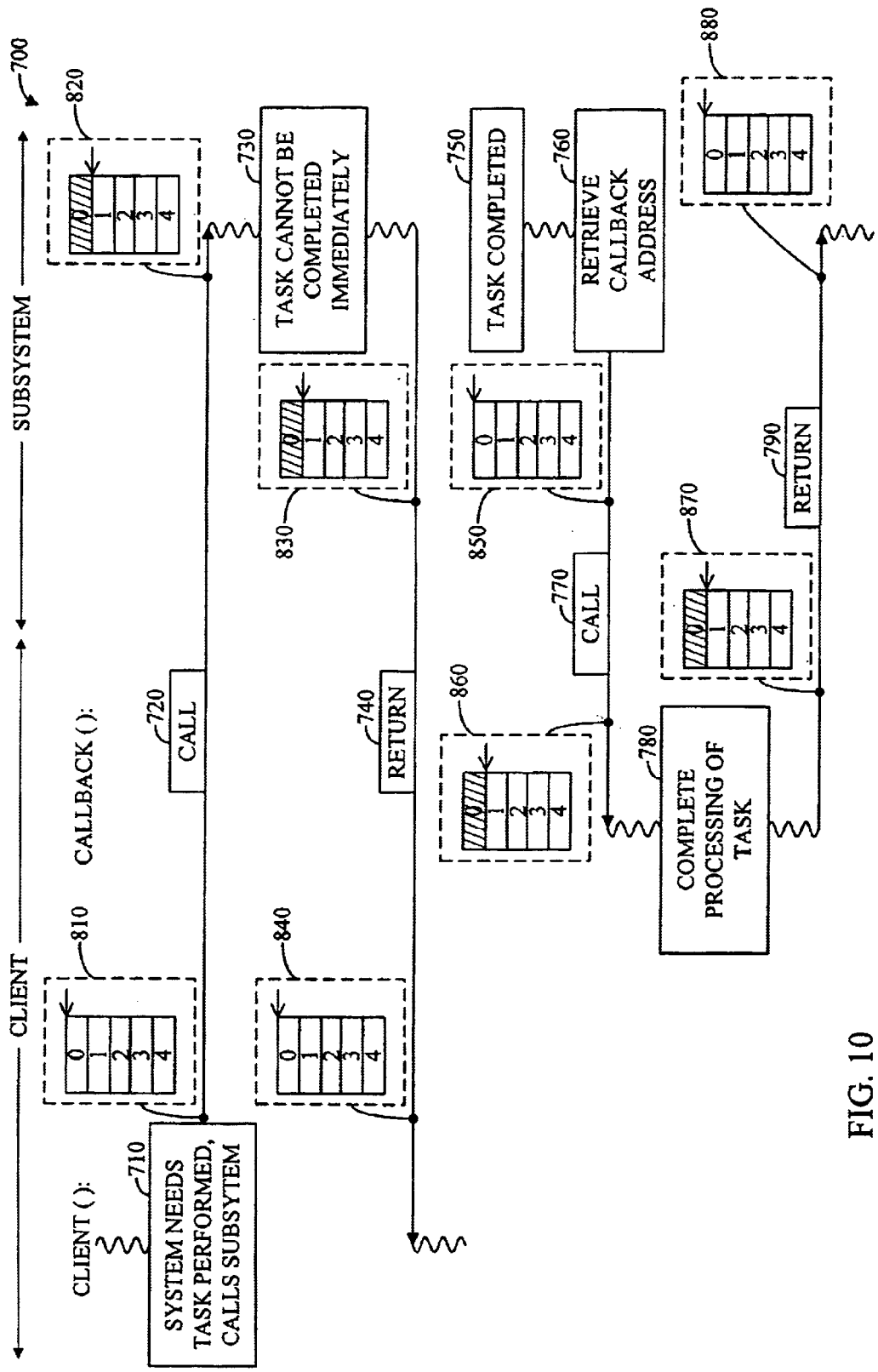
FIG. 10 is a flow diagram depicting asynchronous completion of an asynchronous function, with stack frames shown at each point along the diagram.

FIGS. 9–12 illustrate the call/callback model in action for asynchronous functions that complete in asynchronous and synchronous manners. These figures also show the areas where potential stack problems can occur. FIGS. 9 and 10 deal with an asynchronous function completing in an asynchronous manner. In FIG. 9, a flow diagram 700 for asynchronous completion of an asynchronous function is presented. In the beginning, the computer system decides that it needs a task to be performed (step 710), and will issue a function call to accomplish a specific task (step 720). During the function call, the system generally passes a control block (not shown in FIG. 9) to the subsystem. This control block will usually contain the address of a callback function, which indicates to the subsystem that the subsystem is to call back the system using the callback function. As shown in FIG. 9, the task cannot be completed immediately (step 730), so the subsystem returns (step 740) to await completion of the requested subsystem task. At some time in the future, the requested task is completed by the subsystem (step 750) and the callback function's address is retrieved from the control block (step 760). Then the subsystem performs a call 770 to the callback function and the client processing can continue to finish the task on the client side (step 780). When the callback function has performed its duties, the callback function will return to the subsystem (step 790).

FIG. 10 shows flow diagram 700, except that now a portion of the stack is shown at important processing points. Stack portions 810–880 show the stack pointer illustrated as an arrow. The stack pointer points to the current stack location. Future stack frames will be pushed onto the stack and the stack pointer will be updated to point to the new stack locations. Stack frames 0–4 are shown, but the frames are only representative of actual frames as actual frames will generally vary in size. Before the client performs the call to the subsystem (step 720), the stack pointer is at its starting point for this example (see stack portion 810). In stack portion 820, after step 720 has been performed, a frame has been added to the stack and the stack pointer now points to frame 1. When the task cannot be completed immediately, the subsystem returns in step 740. During this return, the stack goes from having one frame on it (stack portion 830) to having to no stack frames on it (stack portion 840). The stack pointer is now in its original location, and the task is waiting to be completed.

When the subsystem function runs again, in step 750, it will call the callback function. Prior to the call, the stack is again shown at a zero location (stack portion 850). Note that stack portion 810 and stack portion 850 do not necessarily indicate the same starting locations on the stack, as many other stack frames could have been added to or removed from the stack in the interim between steps 740 and 760. The call to the callback, step 770, causes a stack frame to be placed on the stack and the stack pointer to be updated (stack portion 860). Once the callback function completes its processing, it returns (step 790 and stack portion 870) and the stack frame is popped off the stack (stack portion 880). The stack is now at the same location as illustrated in stack portion 860.

FIG. 10 illustrates that a stack overflow error or excessive growth of the stack is unlikely when an asynchronous function executes asynchronously. The stack is always unwinding in this situation because stack frames added by function calls are being removed by function returns, making it more difficult for numerous stack frames to be added to the stack.

Figure 11:
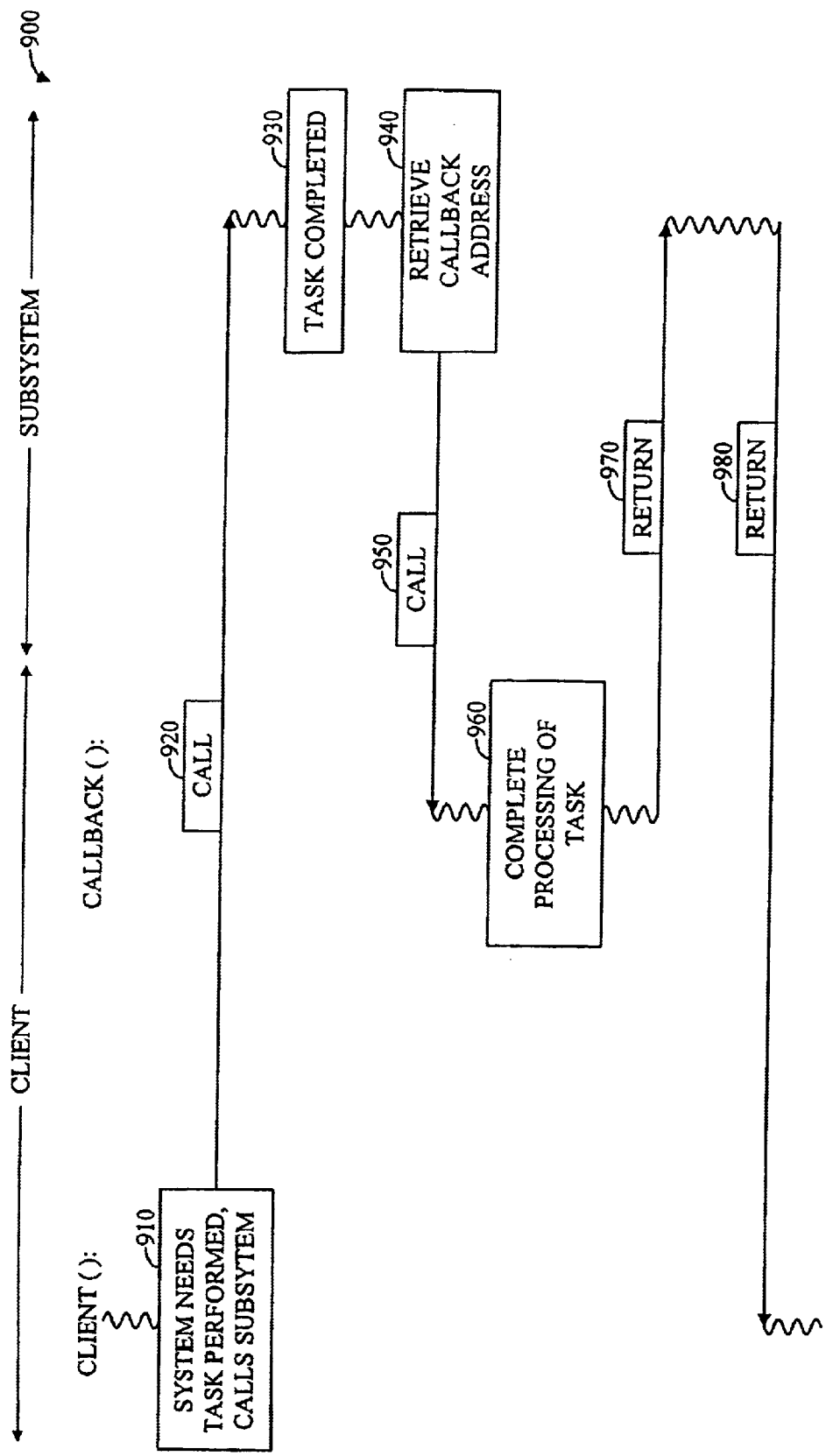
FIG. 11 is a flow diagram depicting synchronous completion of an asynchronous function without the callback mechanism of the present invention.
Figure 12:
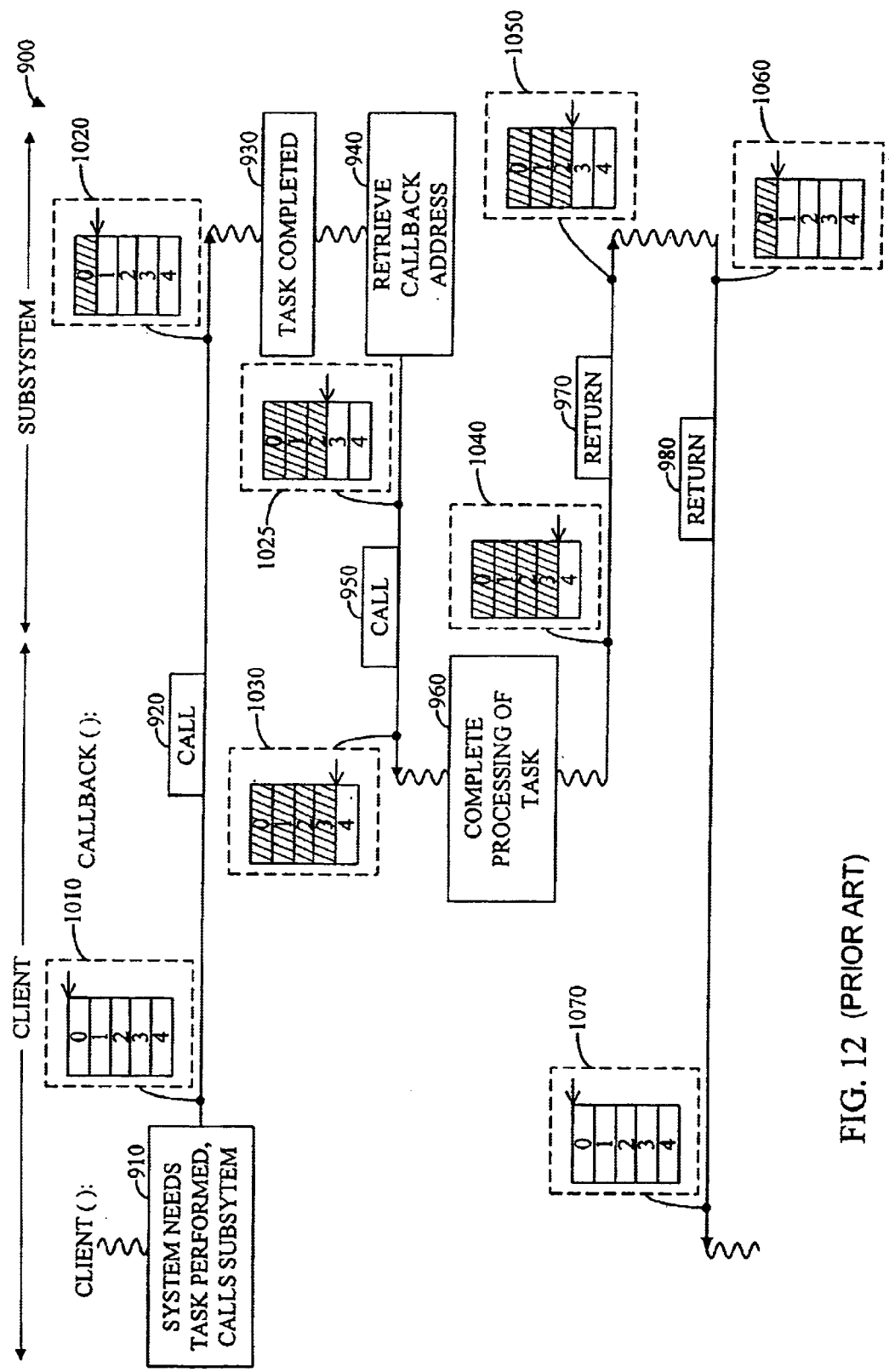
FIG. 12 is a flow diagram depicting synchronous completion of an asynchronous function without the callback mechanism of the present invention, with stack frames shown at each point along the diagram.

FIGS. 11 and 12, however, illustrate a situation where stack overflow or overgrowth problems are much more likely. FIGS. 11 and 12 show an asynchronous function completing synchronously and its effects on the stack. FIG. 11 shows a flow diagram 900 for synchronous completion of an asynchronous function without the present invention. Similar to FIG. 9, the system, in order to accomplish some required task (step 910), will initiate an asynchronous subsystem function call 920. In contrast to the situation depicted in FIG. 9, this time the subsystem immediately completes the requested task synchronously (step 930), issues a callback function to alert the system of the completion of the job (step 940) and issues a call 950. Then, client processing can continue to finish the task on the client side (step 960).

It is at this point, at step 960, that the potential for stack overflow occurs. The subsystem will generally call other subsystems prior to step 940, and these subsystems will usually add more stack frames to the stack. If the subsystem is processing in a loop such that more stack frames are being added to the stack because the subsystem continues to be called and continues to complete synchronously, it is possible that the current subsystem may continue to add additional stack frames to the stack. This can cause the stack to overrun the portion of memory dedicated to the stack or grow so large as to need paging. In addition, other subsystems or interrupt handlers may also add more stack frames at this point. If a stack error does not occur in step 960, the stack will unwind in steps 970 and 980. These steps will return the stack to the starting location. In particular, step 970 allows any subsystems, which the original subsystem called to complete its original task, to complete. Completing these subsystems allows their stack frames to be removed from the stack.

It must be understood that the client, in its callback function step of 960, is completing processing of the task. This could entail receiving data from a hard drive, for instance, and placing this data in an appropriate area of memory. This completion of processing could take a relatively long time. It is this length of time and the number of stack frames that have been added to the stack until step 960 that create the potential for stack overflow or overgrowth. While the client is processing in step 960, the stack is not being unwound. In fact, in all likelihood more stack frames are being added during this processing by other functions, subsystems, and interrupt handlers. A very egregious problem that may occur at this point is if subsystems are continuously being called, and all or most of them complete synchronously. Then, each subsystem will be "stuck" temporarily in step 960, and each subsystem will have added several stack frames to the stack. Because the stack is not being unwound during this delay, the stack keeps growing with each interruption or call to functions or subsystems.

FIG. 12 illustrates these concepts. FIG. 12 shows flow diagram 900 as in FIG. 11, but now stack portions 1010–1060 have been added to visually diagram the problem. Before the client calls the subsystem, the stack pointer is at its zero location (stack portion 1010). After the call (step 920) to the subsystem, there is one frame on the stack and the stack pointer is pointing to the second frame (stack portion 1020). Because the task completes immediately, the subsystem calls the callback function without returning to the client. Before calling the callback function, the subsystem has made other subsystem calls that have placed two more stack frames on the stack. Whether or not more stack frames have been added by the subsystem before the subsystem calls the callback function is generally determined by the complexity of the subsystem. In particular, if the subsystem is calling other asynchronous subsystems that are also completing synchronously, then numerous stack frames could be added at this point. Some extra frames are shown as an example in stack portion 1025. The call to the callback function (step 950) causes another frame to be placed on the stack (stack portion 1030). Any further calls to other functions or subsystems or interrupt handlers may exceed the limit of the stack in this simple example.

Fortunately, in this example, the callback function performs its duties without further calls to functions or subsystems and without interruptions by an interrupt handler, so the stack begins to unwind after step 960. One stack frame is popped off the stack during the return in step 970 (stack portions 1040 and 1050), the frames added by the subsystem are removed before the return to the system (stack portion 1060), and the return of step 980 removes the final stack frame (stack portion 1070). This places the stack in its original location as in stack portion 1010.

Multi-Threaded Operating Systems

In a multi-threaded system, each process can include one or more "threads." Threads are a type of "mini-process" that shares the address space of their parent process. Because the threads share the resources of the parent process, multiple threads can be spun off at one time without requiring excessive memory resources. For these reasons, a thread is often described as a "light process."

A multi-threaded operating system will support the multi-threaded capability of a multi-threaded process and alternate the actual processing activity among several different threads in a specified sequence or, alternatively, in accordance with a priority scheme, where all threads share the same address space. The benefit of a multi-threaded system is that large processes may be broken into small processes (threads), each of which completes its task "concurrently" with the other processes. Each thread is actually time-sliced on a single processor, meaning that each thread has a certain amount of time to run before the processor will run another thread or process.

2. Detailed Description

According to the preferred embodiments of the present invention, a stack unwinding mechanism is provided that reduces stack overflow problems by determining if an asynchronous function completed synchronously and unwinding the stack if the function did complete synchronously. By providing stack management for asynchronous function calls that complete synchronously and by unwinding the stack, the stack unwinding mechanism reduces the chances of stack overflow from synchronous completion of asynchronous functions. The various embodiments of the present invention disclosed herein are especially well-suited to embedded processor environments. Any system, including multi-threaded systems, using a call/callback method of operation or model can benefit from this design.

Referring now to FIG. 1, a computer system 100 in accordance with a preferred embodiment of the present invention is an AS/400 mid-range computer system. However, those skilled in the art will appreciate that the methods and apparatus of the present invention apply equally to any computer system, regardless of whether the computer system is a complicated multi-user computing apparatus or a single user device such as a personal computer, workstation, or embedded systems such as radios, phones, hand-held computers, television set-top boxes, or disk drive subsystems. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100. In particular, it should be noted that the preferred embodiments of the present invention (including processor 110, memory controller 130, and main memory 120) can be placed in an embedded system running in auxiliary storage interface 140, and this embedded system could use the preferred embodiments of the present invention.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an operating system 121, a client 122, and a subsystem 127 within main memory 120. There may be multiple clients operating at one time; however, only one client will be discussed. FIG. 1 is meant to be illustrative but not controlling.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms (including as an update to a current call/callback model), and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators, computer programmers, users, and other computer systems to communicate with computer system 100, normally through programmable workstations. Terminal interface 150 can, however, comprise any type of interface that allows a user to interact with computer system 100. For instance, if the preferred embodiments of the present invention are used in an embedded system in auxiliary storage interface 140, bus 160 and its associated logic could serve as terminal interface 150 so that a main computer can communicate requests to auxiliary storage interface 140. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Main memory 120 suitably contains an operating system 121, a stack 124, a client 122 containing stack unwinding mechanism 123, a control block 125 containing a flag 126, and a subsystem 127 containing a subsystem function 128. There could be one or more stacks 124 and stack 124 could be part of operating system 121. In addition, part of stack 124 could reside on DASD 170, such as if the stack is infinite and can be paged to and from DASD 170. An infinite stack, if it continues to grow, will essentially use all of the space on DASD 170 and in memory 120 that operating system 121 allows to stack 124. When the extra space (on DASD 170 and in memory 120) used for stack. 124 is full, then any further increases in stack size will generally cause exceptions (e.g., errors reported to computer system 100 by operating system 124) or over-written data. Client 122 can be part of operating system 121, a separate program, or any piece of software that communicates with subsystem 127. A client, as the term is used in this specification, is any requester of subsystem services. As such, a client could actually be another subsystem, if that subsystem calls a second subsystem and requests that the second subsystem to perform a task. For the purposes of this illustration, operating system 121 is a multi-threaded operating system and is capable of performing systems management tasks which are typical of operating systems used in computer systems generally. Stack unwinding mechanism 123 is a software mechanism that controls callback functions from the stack perspective and prevents undesired stack overflow from synchronous completion of asynchronous functions. Flag 126 is used by stack unwinding mechanism 123 to track the synchronous completion of an asynchronous function (such as subsystem function 128), allowing stack unwinding mechanism 123 to clear unneeded callback functions associated with the asynchronous functions from the stack. This will be discussed in more detail below.

It should be understood that main memory 120 will not necessarily contain all parts of all mechanisms shown. For example, portions of client 122 and operating system 121 may be loaded into an instruction cache (not shown) for processor 110 to execute, while other files may well be stored on magnetic or optical disk storage devices (not shown). In addition, although client 122 is shown to reside in the same memory location as operating system 121 and stack unwinding mechanism 123, it is to be understood that main memory 120 may consist of disparate memory locations. The term "memory" as used herein refers to any storage location within the virtual address space of system 100.

As stated previously, clients call subsystems to have the subsystems complete various tasks, such as retrieving information from hard drives. Many of these subsystem functions are asynchronous functions. Asynchronous functions that complete synchronously create potentials for stack problems. To alleviate these problems, a preferred embodiment of the present invention determines whether the asynchronous function completed synchronously or asynchronously. If the asynchronous function completed its task asynchronously, little chance for stack error occurs, and the system functions substantially as described with reference to FIGS. 9 and 10. If the asynchronous function completed its task synchronously, the stack unwinding mechanism 123 unwraps the stack (or accelerates the unwrapping of the stack) by returning before the completion of the client's task and "off-loads" the client's processing of the task until a later time. The client off-loads its processing of the task until, in its main loop, it calls the callback function to complete processing of the task. The unwrapping of the stack virtually eliminates any potential for stack overflow or overgrowth caused by asynchronous functions that complete synchronously. It is possible that some processing by the client can be performed before the callback function returns to the client; however, the longer the system stays in the callback function, the higher the chances of stack overflow or stack overgrowth. Thus, it is preferable that only minimal or no client task processing is performed before a return in the most preferred embodiment of the present invention. In a preferred embodiment of the present invention, stack unwinding mechanism 123 operates both in the client's main program or thread of execution and in the callback function's program or thread of execution.

It is important to note that the task given to the subsystem is part of a "larger" client task. The client needs a task performed and it informs the subsystem that the subsystem has its own task, which is needed to complete the client's task, to perform. The subsystem completes its part of the task (e.g., by retrieving information from a hard drive), then the client completes its part of the task (e.g., by retrieving the information from the hard drive and placing this information in memory). In a most preferred embodiment, the callback function is the mechanism that actually completes the client's task. However, any system wherein an asynchronous subsystem calls back the client after the subsystem completes synchronously will cause a scenario that has the potential to cause stack overflow or overgrowth.

Figure 2:
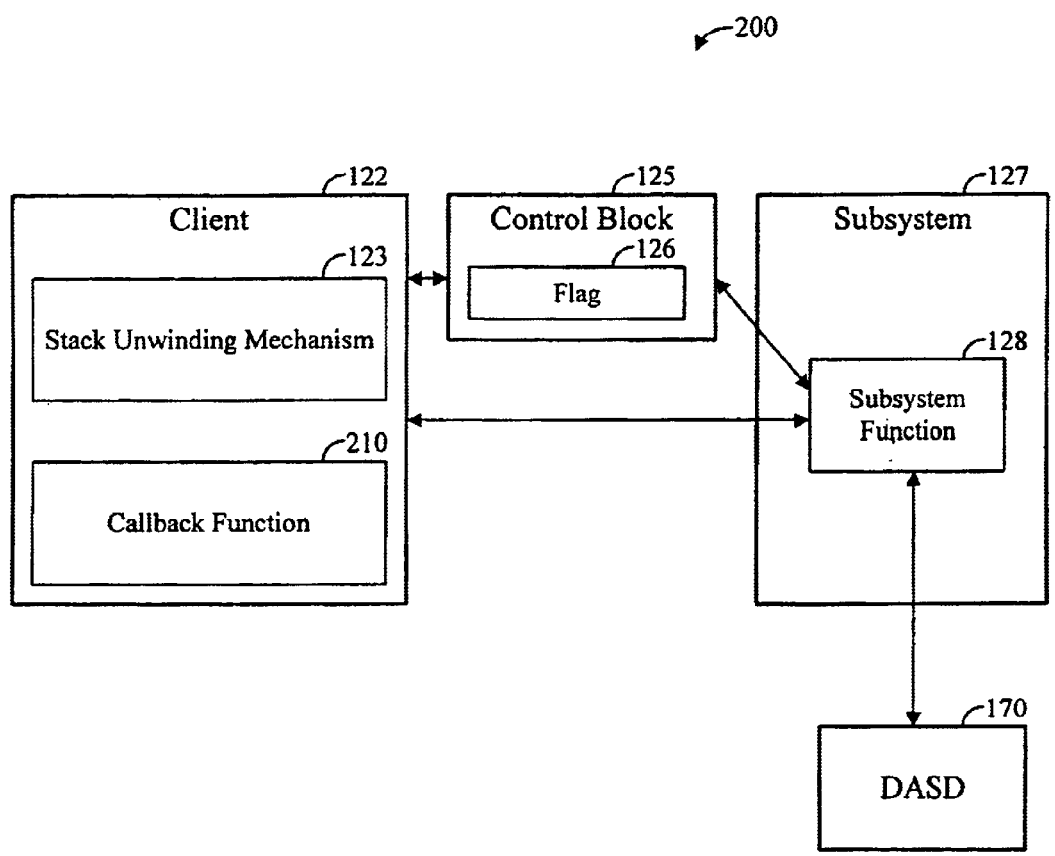
FIG. 2 is a functional block diagram of a client interacting with a subsystem in accordance with a preferred embodiment of the present invention.

Referring now to FIG. 2, a block diagram illustrating major functional elements of computer system 100, in accordance with a preferred embodiment of the present invention, is shown. Client 122 contains callback function 210 and client 122 interacts with control block 125 and subsystem function 128. Subsystem function 128, as part of subsystem 127, retrieves and sends information to DASD 170 in this example. There will generally be many subsystems and several subsystem functions per subsystem, but only one subsystem and subsystem function are shown here. Subsystem 128, in this example, would reside in auxiliary storage interface 140 (not shown in FIG. 2). It should be noted that all of the functionality contained in main memory 120 (shown in FIG. 1) could be contained in auxiliary interface 140. Callback function 210 is a function that finishes processing a task, such a retrieving data from a subsystem. When subsystem 127 finishes its task it will generally, according to the call/callback model, call client 122 back by calling callback function 210 to inform client 122 that subsystem 127 has completed its task.

Prior to contacting subsystem 127 and subsystem function 128, client 122 will usually create a control block 125 and place flag 126 and the address of callback function 210 (not shown in FIG. 2) in this control block, which is an area of memory that preferably holds information about the subsystem task. Each task for each subsystem will generally have a control block 125 associated with the task and the client will create each control block 125 and place a space for flag 127 in each control block 125. The client will generally pass the address of the control block to each subsystem and each subsystem will return the address back to the client during the callback function call so that the client knows which task is being performed. While the control block will be described as being passed to and from subsystem 127 through a pass-by-address scheme, any method known to those skilled in the art can be used to inform the subsystem of its task and have the subsystem inform the system that the task is completed. For instance, variables and data that make up a control block 125 could be passed to subsystem 127, and subsystem 127 could pass back needed variables and data to client 122. Control block 125 also allows each flag 126 associated with each control block 125 to be easily found and tested. Although this is the most preferred embodiment for implementing flag 126, many other embodiments can perform the same function. For instance, multiple flags could be implemented in a tabular format, wherein both the address of each control block and each control block's flag would be stored. Note that there will generally be many of these control blocks, flags, and subsystems operating at any one time.

Under normal operating conditions, client 122 creates control block 125 and passes the address of control block 125 to subsystem function 128. Subsystem function 128 uses control block 125 to determine what its task is. Once it completes this task (e.g., it successfully retrieves information from DASD 170), it uses control block 125 to retrieve the address of callback function 210. Subsystem function 128 then calls callback function 210. Callback function 210 completes the processing of the task, normally by retrieving data from subsystem function 128 and placing it into main memory 120 (not shown in FIG. 2).

Stack unwinding mechanism 123 manipulates and uses flag 126 to determine whether subsystem function 128 completed synchronously or asynchronously. Stack unwinding mechanism 123 is preferably part of both client 122 and callback function 210 (which is, itself, part of client 122). This most preferred embodiment of the present invention will be detailed with reference to FIGS. 3, 4, and 8. This preferable separation of stack unwinding mechanism 123 occurs because callback function 210 is a sub-function of client 122 and it is easiest to perform certain flag operations in both client 122 and callback function 210. Furthermore, this embodiment does not require additional changes to subsystems or subsystem functions so that current subsystems will work with the preferred embodiments of the present invention. Stack unwinding mechanism 123 can also be implemented in a variety of other ways. For instance, stack unwinding mechanism 123 can be changed to one sub-function within client 122, wherein this sub-function will contain all the functionality of the split version of the most preferred embodiment as detailed in forthcoming FIGS. 3, 4, and 8. This is less preferred because stack unwinding mechanism 123 will have to determine whether the client or the callback function called stack unwinding mechanism 123; however, this is still a viable alternative stack unwinding mechanism.

Figure 3:
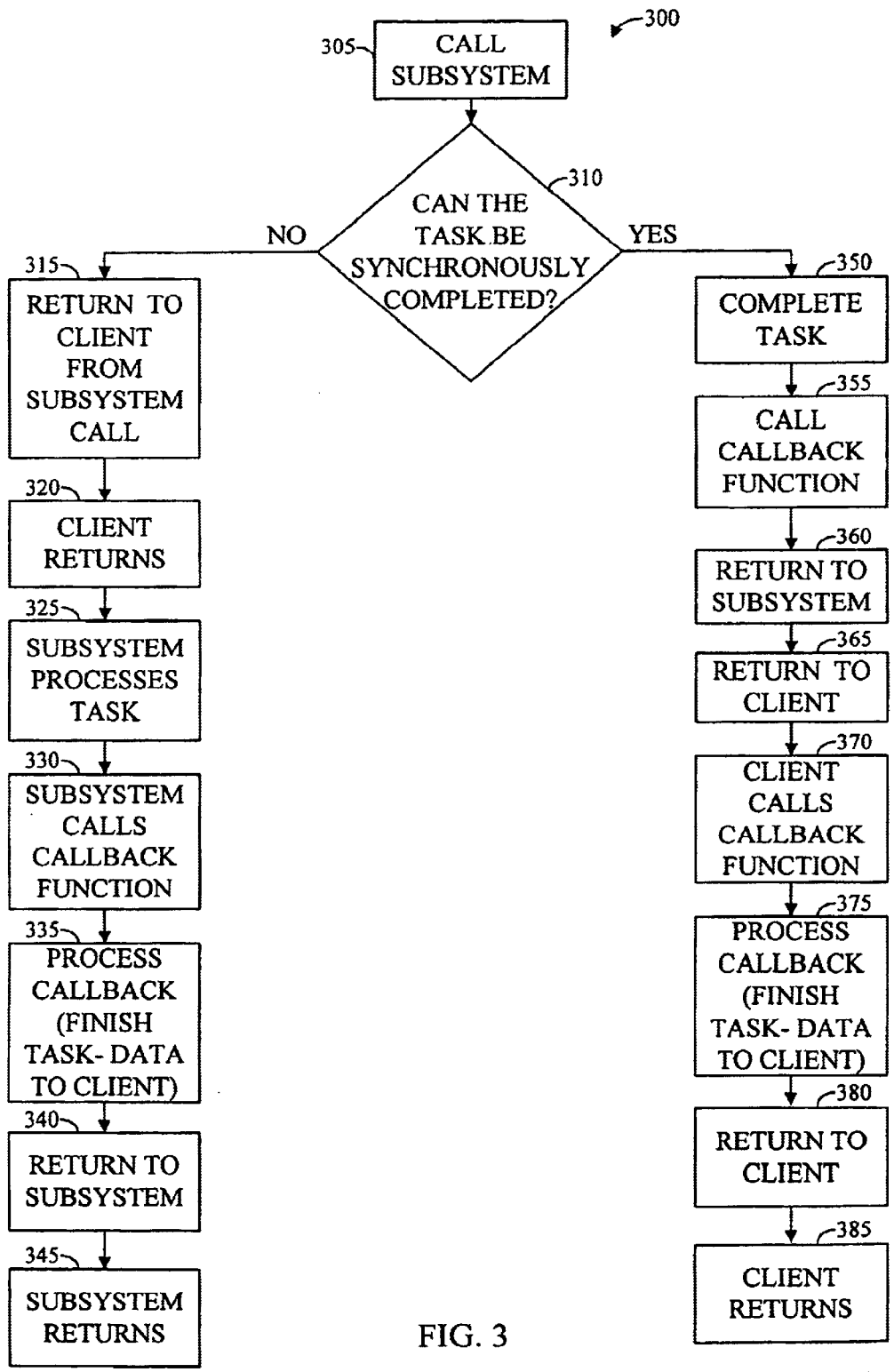
FIG. 3 is a flowchart of a method for using a stack unwinding mechanism in accordance with a preferred embodiment of the present invention.

Turning now to FIG. 3, a method 300 for implementation of a stack unwinding mechanism in accordance with a preferred embodiment of the present invention is presented. Method 300 shows the important, global steps taken by stack unwinding mechanism 123 so that stack unwinding mechanism 123 can provide better stack management when an asynchronous function completes synchronously. FIG. 3 does not, however, illustrate the manipulation of flag 126 by stack unwinding mechanism 123. Flag 126 is used in the most preferred embodiments of the present invention to provide a relatively easy method of stack management, but the implementation details of the flag's manipulation are harder to understand if overall system functionality is not well understood. Thus, FIG. 3 gives a general overview of system functionality before the particulars of flag manipulation are developed in FIGS. 4 and 5.

At the most basic level, FIG. 3 diagrams that stack unwinding mechanism 123 determines if the subsystem (an asynchronous function) completed its task synchronously and, if so, stack unwinding mechanism 123 will unwrap the stack. To perform this determination and unwrapping of the stack, method 300 starts when an asynchronous subsystem 127 is called (or subsystem function 128 is called) to accomplish whatever task may need to be accomplished according to the task at hand (step 305). This step may represent a call to a disk drive system, a printer request, a memory fetch, etc. During this step, the address of the control block is preferably passed to subsystem 127.

If the task can be synchronously completed (step 310=YES), the subsystem will generally complete the task (step 350) or will know that it can complete the task. Then the subsystem will retrieve the callback function's address from the control block and will call the callback function (step 355). The callback function's purpose is to both inform the client that the task is done and to actually take the steps to complete the task, such as retrieving information from the subsystem and placing it in main memory. However, the time spent in the callback function, as stated previously, is one factor leading to potential stack overflow or overgrowth problems. To mitigate these problems, the most preferred embodiment of the present invention returns from the callback function without processing the task. This occurs in step 360. In step 365, the subsystem returns to the client. The stack has now been unwound.

There still remains processing that needs to be completed for the task to end. Thus, the client itself calls the callback function in step 370, and the callback function performs the processing needed to complete the task (step 375). Stack unwinding mechanism 123, thus, off-loads processing until the stack has been unwrapped. This minimizes the time spent in the callback function when the callback function has been called by the subsystem. Because the stack is unwrapped when the client calls the callback function, there will be far fewer stack frames on the stack and there is a much lower chance of stack overflow or overgrowth. Once the task is complete, the callback function returns to the client (step 380) and the client then returns (step 385).

If the subsystem cannot finish its task immediately (step 310=NO), the subsystem will return to the client (step 315) and the client will return (320). Sometime later, the subsystem will run again and will complete the task (step 325). The subsystem then calls the callback function (step 330), which then finishes processing the task on the client side (step 335) and return to the subsystem (step 340). The subsystem then returns (step 345).

Figure 4:
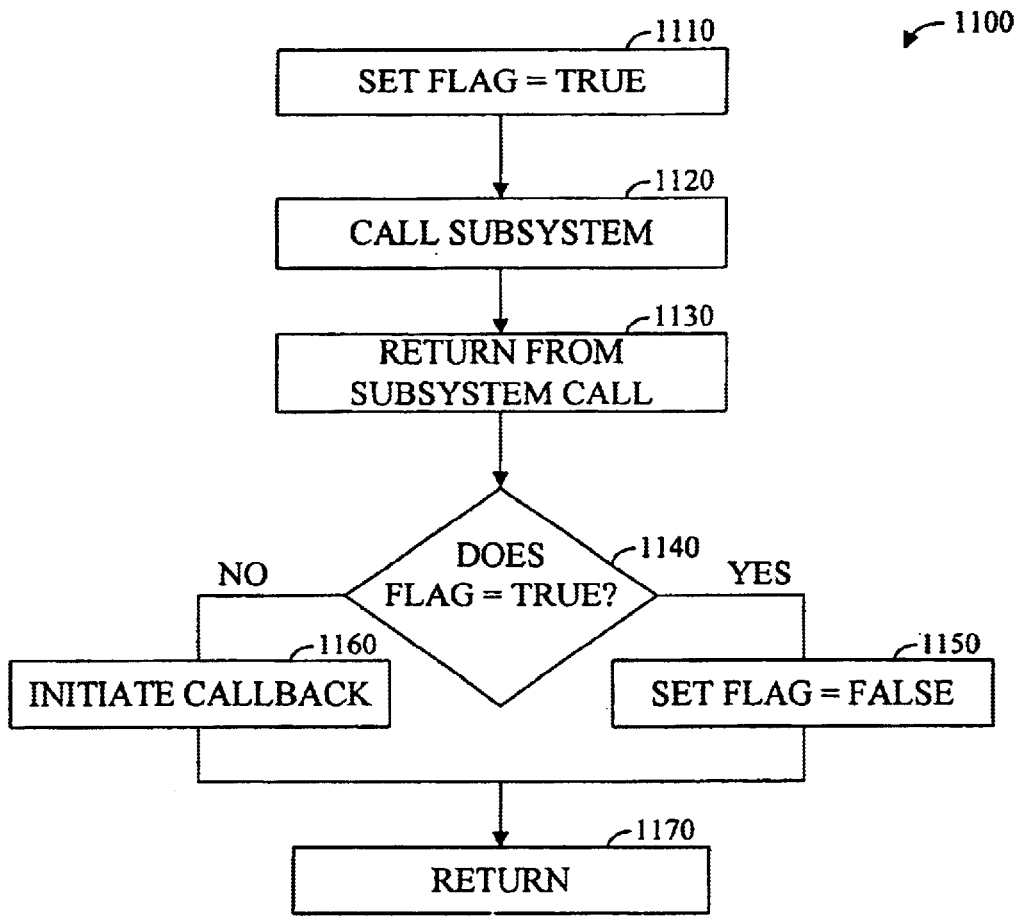
FIG. 4 is a flowchart of a method used by a client for stack management in accordance with a preferred embodiment of the present invention.
Figure 5:
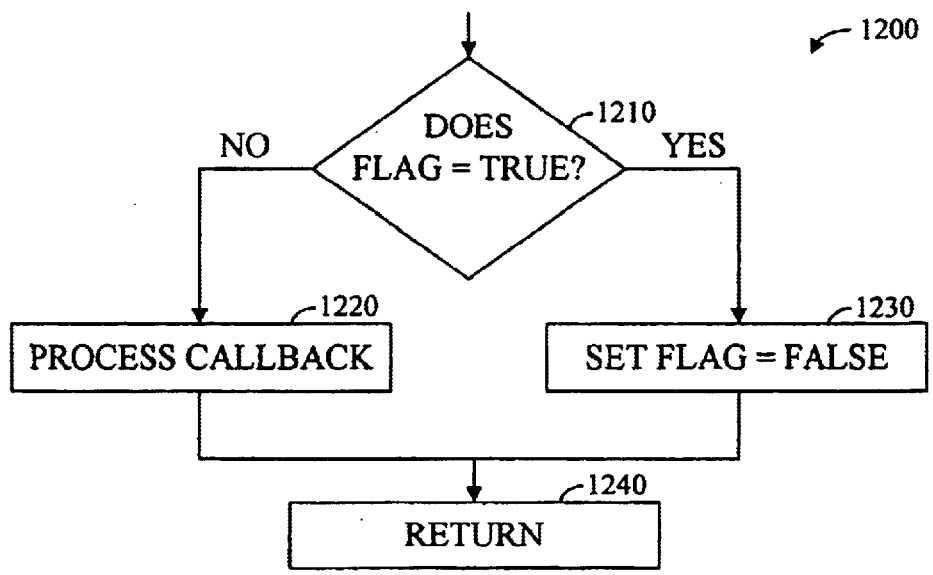
FIG. 5 is a flowchart of a method used by a callback function for stack management in accordance with a preferred embodiment of the present invention.

Turning now to FIGS. 4 and 5, these figures show methods that stack unwinding mechanism 123 uses to determine whether an asynchronous function completed synchronously, such that the stack must be unwrapped and the client's processing of the task delayed until the client's main program, or asynchronously. There are, however, some important caveats to be considered before proceeding to a description of these figures. First, FIG. 4 represents a part of stack unwinding mechanism 123 contained in the client, and FIG. 5 represents a part of stack unwinding mechanism 123 contained in the callback function. Second, the callback function can be called by the subsystem when the subsystem can complete its task synchronously (this occurs between steps 1120 and 130 of FIG. 4), be called by the client (step 1160 of FIG. 4), or run at a later time in another system state when the subsystem cannot complete its task synchronously. Finally, the flag's state at each location in FIGS. 4 and 5 does not necessarily indicate whether the asynchronous function completed synchronously or asynchronously. This will be more apparent in the discussions that follow.

Referring now to FIG. 4, a method 1100 for implementation of the client part of the stack unwinding mechanism in accordance with the preferred embodiments of the present invention is presented. Method 1100 begins when stack unwinding mechanism 123 sets flag 126 to TRUE (step 1110). Flag 126 will be used later to indicate whether the subsystem completed synchronously or asynchronously and whether the callback function should process or not process the callback. The client then calls the subsystem in step 1120, generally passing the address of a control block to the subsystem. The control block usually contains flag 126, the task to be performed, and the address of the callback function. Between the time the subsystem is called (step 1120) and the subsystem returns to the client (step 1130), the callback function (and method 1200 of FIG. 5) may be performed. The callback function will be performed if the subsystem can complete its task in the same system state and the subsystem calls the callback function to tell the client that the task is done. The callback function will not be called immediately by the subsystem if the subsystem cannot perform its task in the same system state.

Regardless of whether the subsystem can or cannot complete its task immediately, it will generally return (step 1130) to the client. Stack unwinding mechanism 123 will check the status of the flag 126 associated with this control block 125 to see if flag 126 is TRUE (step 1140). At this point, if the flag is TRUE then the callback function (and method 1200 of FIG. 5) did not run and the subsystem will complete asynchronously. The flag is then set false, in step 1150, to indicate to the callback function that it should process the callback. The callback function, in this situation, will be called by the subsystem at some later point in time after the subsystem completes the task.

If the flag is FALSE, the subsystem completed synchronously and the callback function (and method 1200 of FIG. 5) has run and set the flag to false. In this instance, the stack will have already been unwound, and the callback function must be processed directly. This means that stack unwinding mechanism 123, as part of client 122, will initiate the callback function (step 1160). Because the client calls the callback function as part of its main loop, the stack has been unwound and the time spent in the callback function, after it has been called from the subsystem, is minimal. This should greatly reduce chances for stack overflow. After performing either step 1160 or step 1150, the client will return (step 1170).

Referring now to FIG. 5, a method 1200 is presented that implements the callback function part of the stack unwinding mechanism in accordance with a preferred embodiment of the present invention. Each time the callback function runs, method 1200 will be performed as part of stack unwinding mechanism 123. The address of the control block associated with the current task will generally be sent to the callback function so that the callback function will know which flag 126 to test. As shown in FIG. 5, the flag is tested by stack unwinding mechanism 123 as soon as the callback function begins executing. If the flag is TRUE (step 1210= YES), then the subsystem completed synchronously and the callback function is being called by the subsystem. In this instance, the flag is set to FALSE (step 1230) and the function immediately returns to the subsystem (step 1240). In previous systems, the callback function would, at this point, perform whatever processing is necessary to complete the task at the client level. In FIG. 5, however, step 1210 is placed near or at the beginning of the callback function so that the callback function can determine if the asynchronous function has completed synchronously. If the function completed synchronously, stack unwinding mechanism 123 returns to the subsystem. This quick return serves two purposes. First, the time spent in the callback function, which as illustrated in reference to FIGS. 11 and 12 causes the potential for stack overflow or overgrowth, is minimized. Second, the return from the callback function allows the subsystem and all calls made by the subsystem to complete their processing, and the stack has a chance to unwind. Because of these returns, the stack should be completely unwound in a very short time period.

If the flag is FALSE in step 1210, there are two possible reasons for this. First, the stack unwinding mechanism could have set the flag false, as discussed in the previous paragraph. When the subsystem completes synchronously, there still remains processing to be completed by the client. The client itself then calls the callback function in step 1160 of FIG. 4 to complete this processing and finish the task. The processing, thus, is off-loaded such that the client will subsequently call the callback function in the client's main loop, program, or thread of operation. In this case, the stack unwinding mechanism returns (step 1240) to the client.

Second, if the subsystem completed asynchronously, the subsystem will run at some later time and complete its task. Once the task is complete, the subsystem will call the callback function. This time, flag 126 has been set to FALSE by the client in step 1150 of FIG. 4. When the call from the client subsequently happens, the callback function, after testing flag 126, proceeds to do the callback processing (step 1220) and returns to the subsystem (step 1240).

Flag 126 in methods 1100 and 1200 indicates slightly different statuses in each method. In method 1100, which is performed by the client, a value of TRUE indicates that the asynchronous function (subsystem) actually will complete asynchronously. Similarly, a value of FALSE indicates that the subsystem completed synchronously and processing must be performed by the client and callback function. Conversely, in method 1200, which is performed by the callback function of the client, a value of TRUE means that no processing must be performed and that the subsystem completed synchronously. A value of FALSE means that processing must be performed, but that the subsystem completed synchronously or asynchronously. In short, flag 126 serves two different purposes, one purpose for each method: in method 1100, the flag indicates the asynchronous/synchronous completion of the subsystem, while in method 1200 the flag indicates whether processing must or must not be performed.

Two examples will help clarify the paths taken through the methods by asynchronous functions that complete synchronously or asynchronously. For the first example, consider the asynchronous completion of an asynchronous function. In step 1120, the subsystem is called by the client. The task cannot be immediately completed, so the subsystem returns to the client in step 1130. Flag 126 is still TRUE (step 1140), so stack unwinding mechanism 123 (as part of client 122) sets the flag to FALSE (step 1150). The client then returns (step 1170). At some time in the future, the subsystem completes its task and notifies the client by calling the callback function. Stack unwinding mechanism 123, preferably as part of the callback function (which is itself part of client 122), tests flag 126 in step 1210. Because the flag is FALSE, the callback will be processed in step 1220 and the callback function will return to the subsystem in step 1240.

Figure 6:
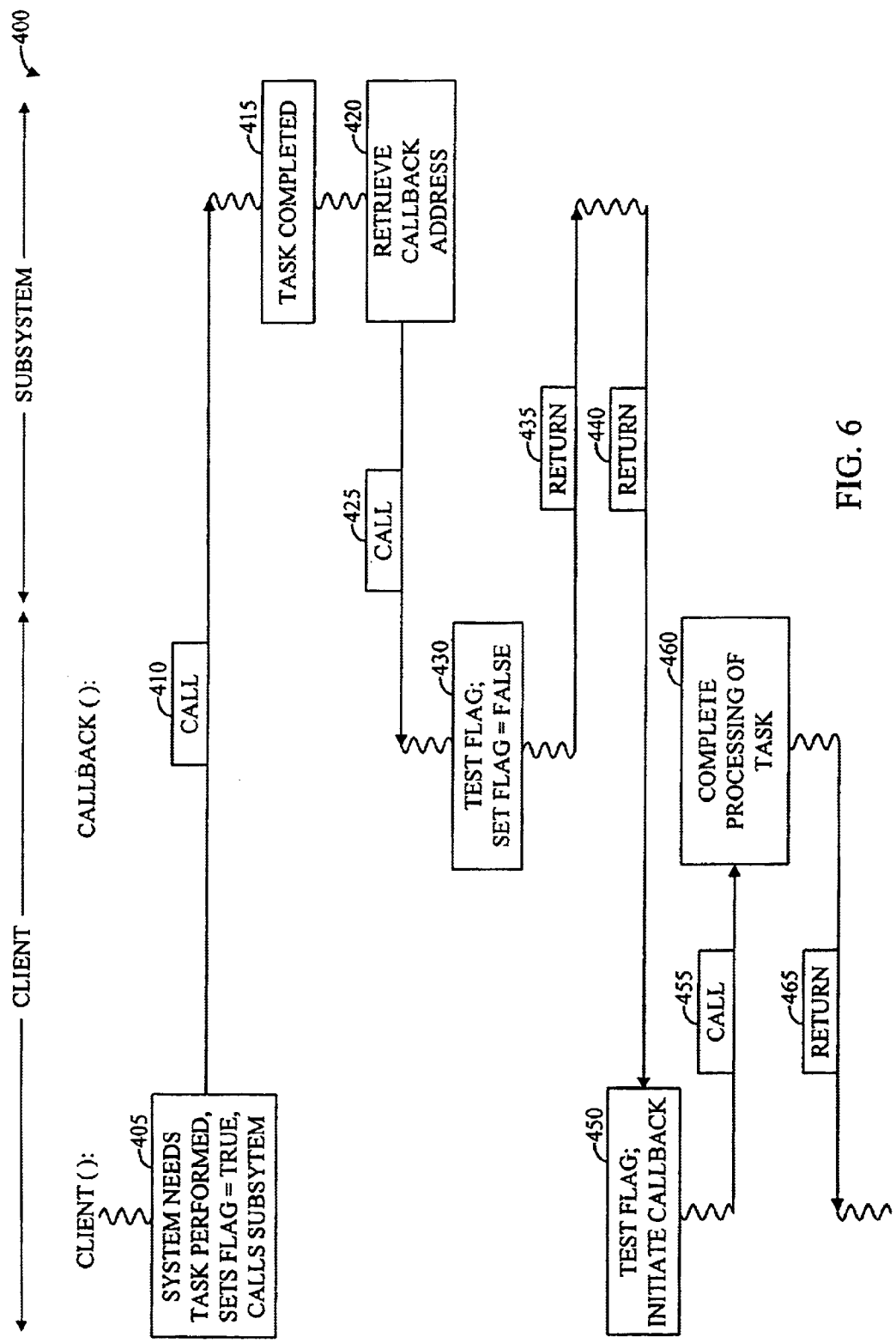
FIG. 6 is a flow diagram depicting synchronous completion of an asynchronous function using the callback mechanism of the present invention.
Figure 7:
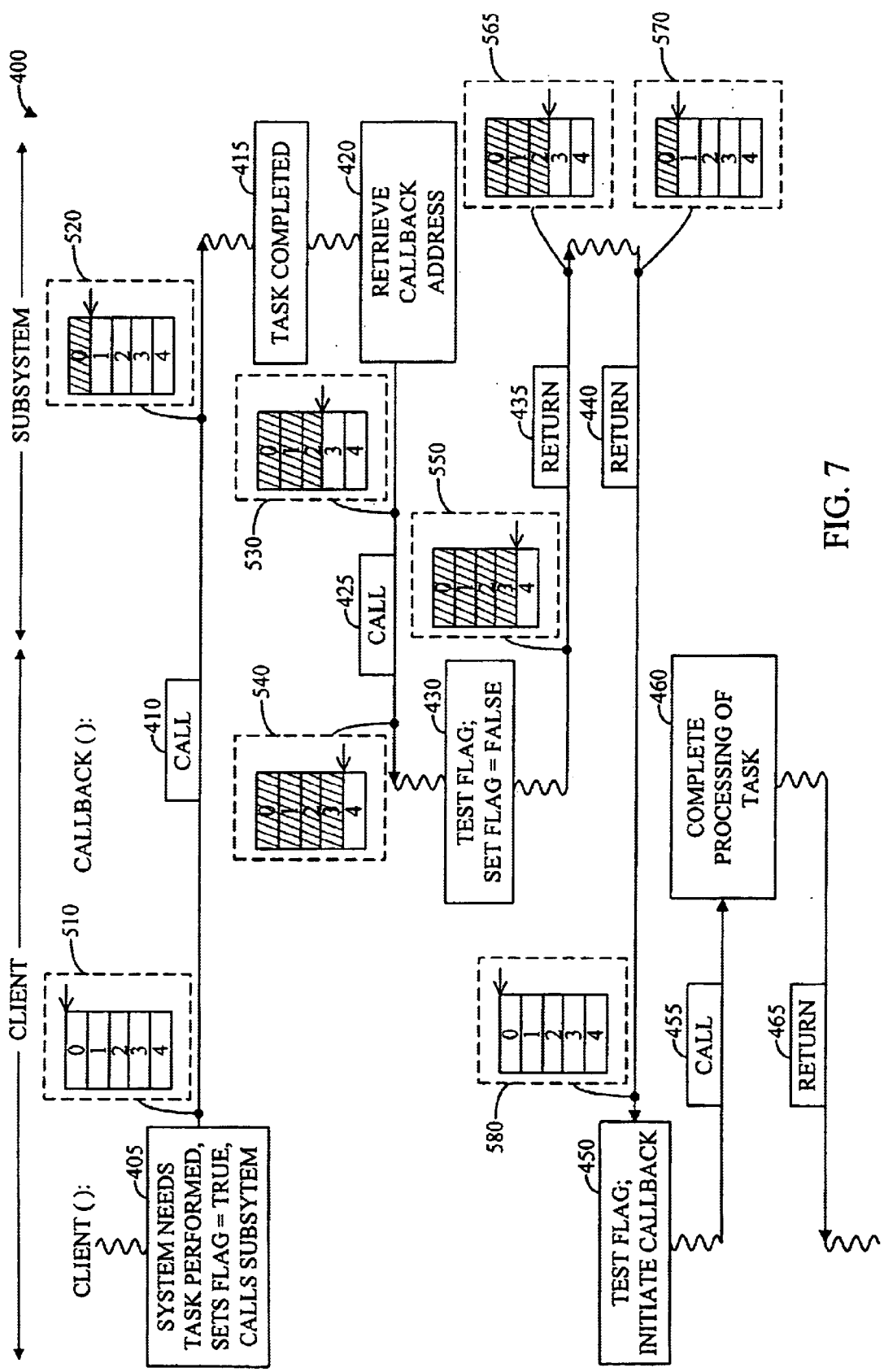
FIG. 7 is a flow diagram depicting synchronous completion of an asynchronous function using the callback mechanism of the present invention, with stack frames shown at each point along the diagram.

For the second example, consider the synchronous completion of an asynchronous function. This case is presented in FIGS. 6 and 7. References will be made also to FIGS. 4 and 5. FIG. 6 shows a flow diagram 400 for synchronous completion of an asynchronous function using the stack unwinding mechanism of the present invention. FIG. 7 presents the same situation as described above in reference to FIGS. 11 and 12, but includes the additional processing performed by a stack unwinding mechanism in accordance with a preferred embodiment of the present invention. As shown in FIG. 6, when a system issues an asynchronous function call, a flag is set to TRUE just before the function call is made (step 405, which corresponds to step 1110 in FIG. 4). When call 410 goes forward, as with FIGS. 11 and 12 above, the task is completed synchronously (step 415) and the subsystem retrieves the callback function (step 420) and calls the callback function (step 425). However, in this case, the flag is tested (step 430, which corresponds to step 1210 in FIG. 5) and, since the flag is TRUE, the system knows that the subsystem has completed synchronously. Therefore, the flag is set to FALSE (step 430, which corresponds to step 1230 in FIG. 5) and the system returns to the subsystem (step 435, which corresponds to step 1240 in FIG. 5) and, from there, returns to the client (step 440, which corresponds to step 1130 in FIG. 4). This unwinds the stack and limits the potential for stack overflow or overgrowth problems. Similar to the callback function, the client tests the flag (step 450, which corresponds to step 1140 in FIG. 4), and initiates the callback function (step 450) with a call 455, corresponding to step 1160 in FIG. 4. Then, the callback function will perform the necessary processing to complete the task (step 460) and return to the client when completed (step 465). The client then returns in step 1170 of FIG. 4.

Referring now to FIG. 7, the flow diagram 400 of FIG. 6 is shown, only now small portions of the stack are shown at each important processing point. Before the subsystem is called (step 410), the stack is at a starting location, as illustrated by stack portion 510. After the call to the subsystem, a frame is on the stack due to the call (stack portion 520). During the subsystem's processing, the subsystem may call other sub-functions or other subsystems that might place additional stack frames on the stack. This is illustrated by stack portion 530. The subsequent call to the callback function (step 425) places yet another stack frame on the stack (stack portion 540). At this point, the stack is quite full and any subsequent calls may overflow the stack or cause the stack to be paged out to disk. However, stack unwinding mechanism 123 tests the flag and discovers that the subsystem function has completed synchronously. Stack unwinding mechanism 123 sets the flag equal to FALSE here and returns without undue delay or processing. The short time in the callback function means that there is less time for other functions to add stack frames at this critical juncture of processing. In addition, this allows the subsystem to unwrap the several stack frames placed on the stack during its processing. Even if the total system is in some type of iterative state, where constant tasks are being sent to the same or several subsystems, the constant unwrapping of the stack by the current invention will eliminate the vast majority of stack overflows or overgrowth.

When the callback function returns, one stack frame is popped off the stack (stack portions 550 and 565), and the subsystem gets to perform clean up operations that pop the frames added during its processing (stack portion 570). At this point, one more stack frame removal is all that is needed to place the stack in its original location. This occurs in step 440 (stack frames 570 and 580).

Referring now to FIG. 8, a code section 700 for implementing a preferred embodiment of a stack unwinding mechanism of the present invention is presented. Code section 700 illustrates the salient points of stack unwinding mechanism 123 and methods 1100 and 1200, placed into code form. Code section 700 is basically self explanatory when viewed in conjunction with the previous discussions, but one particularity that has not been previously discussed needs to be presented. Testing and setting flags in the manner used in the previous discussions and in code section 700 can be problematic in a preemptive multitasking system. The requirement is that, if the subsystem completes asynchronously, the test and set following the SubsysFunct( ) call return must occur before the test and set in ClientCallback( ). This can be assured through a variety of synchronization mechanisms depending on the preemption environment. If the test-and-set is not atomic, then one process could read the state of the flag but not change the flag. A second process could then change the flag, only to have the first process then change the flag. This usually could not occur in a non-preemptive environment because each function would not be interrupted. To prevent this anomaly, important sections of code are placed in "protected" regions where only one process can have access to the protected area of code at one time.

The most preferred embodiments of the present invention have been described. These embodiments are the most preferred because they generally require no significant subsystem modifications to fully implement. Instead, in most applications, only clients (and callback functions of the clients) need be modified to support the current invention. If modifications to subsystems are acceptable, another embodiment of the present invention can be implemented. Referring back to FIG. 6, after the subsystem's task is completed in a synchronous manner (step 415), the subsystem itself would set the flag equal to FALSE. Steps 420, 425, and 435 would not be performed. Instead, once the subsystem completes the task and sets the flag, the subsystem would return to the client in step 440. When the subsystem returns to the client, the client tests the flag (see FIG. 4, step 1140). If the flag is FALSE, the client calls the callback function in step 1160. Step 1230 of FIG. 5, wherein the callback function has tested the flag an found that the flag is TRUE is no longer necessary, because the subsystem is performing this setting of the flag to FALSE.

If the subsystem cannot complete its task immediately (the subsystem will complete its task asynchronously), then the subsystem would generally not change the flag at this stage. Were the subsystem to change the flag at this point, the client (in step 1140 of FIG. 4) would find a FALSE flag and run the callback function (step 1160). It is highly unlikely that the asynchronous task would be complete at this stage, as the subsystem just returned to the client and generally will not run until sometime in the future. The callback function then would not need to perform step 1230 of FIG. 5 because the only entities changing the flag to false are the client (step 1150 of FIG. 4) and the subsystem (if the subsystem completed its task synchronously).

Thus, the subsystem can be made to perform some aspects of the stack unwinding mechanism. This is a less preferred embodiment only because subsystems, clients, and callback functions would all have to be changed to implement this embodiment. The most preferred embodiments only entail changing clients and callback functions.

By implementing the preferred embodiments of the present invention, the potential for stack overflow problems inherent in current systems can be substantially eliminated and system performance can be enhanced. Specifically, no additional system calls or context switches are required using the present invention. In addition, this solution presented herein offers better performance than the so-called "infinite stack" solution because the stack size is controlled and there will be less of a requirement to page the stack in and out of memory.

Further, the most preferred embodiments of the present invention provide a client controlled code flow and there are no additional required interfaces to the existing subsystems. This provides for flexibility and compatibility for adopting the solutions contained herein with existing systems and subsystems. There is no requirement that the subsystem communicate explicitly to the client whether it completed synchronously or asynchronously.

Finally, the present invention is very robust and adds a great deal of stability to systems where the solutions presented herein are adopted. Specifically, an explicit return function is provided for all suitable asynchronous function calls and, therefore, all relevant return codes are provided back to the callers without exception. This eliminates stack overflow-related errors, enhancing both system performance and stability.

While the present invention has been particularly shown and described with reference to preferred embodiments thereof, it will be understood by those skilled in the art that various changes in form and details may be made therein without departing from the spirit and scope of the invention.

What is claimed is:

1. An apparatus comprising:
    a processor coupled to a bus;
    a memory coupled to the bus; and
    a stack unwinding mechanism residing in the memory, the stack unwinding mechanism unwrapping a stack by returning before completion of a client task if an asynchronous function completed a second task synchronously.

2. The apparatus of claim 1 wherein the stack is at least partially present in memory.

3. The apparatus of claim 1 wherein the apparatus further comprises a client that calls the asynchronous function and wherein the stack unwinding mechanism unwraps the stack by returning to the client from the asynchronous function if the asynchronous function completed the second task synchronously.

4. The apparatus of claim 1 wherein the asynchronous function is part of a subsystem.

5. The apparatus of claim 1 wherein the second task must be completed as part of the client task.

6. The apparatus of claim 1 wherein the client completes the client task after the stack has been unwrapped.

7. The apparatus of claim 6 wherein the client completes the client task by calling a callback function that then completes the client task.

8. The apparatus of claim 7 wherein the stack unwinding mechanism directs the client to call the callback function after the stack unwinding mechanism has unwrapped the stack.

9. The apparatus of claim 1 wherein the stack unwinding mechanism determines by using a flag whether the asynchronous function completed the second task synchronously.

10. The apparatus of claim 9 wherein the flag is contained in a control block residing in the memory, and wherein the stack unwinding mechanism uses an address of the control block to access the flag.

11. The apparatus of claim 4 wherein the second task is contained in a control block residing in the memory, and wherein the client directs the subsystem to perform the second task by passing an address of the control block to the subsystem.

12. An apparatus comprising:
    a processor coupled to a bus;
    a memory coupled to the bus;
    a stack residing in the memory;
    an asynchronous subsystem function and a client residing in the memory, the client directing the asynchronous subsystem function to perform a subsystem task as part of performing a client task; and
    a stack unwinding mechanism residing in the memory, the stack unwinding mechanism unwrapping the stack before completion of a client task if the asynchronous subsystem function completed the subsystem task synchronously, the stack unwinding mechanism unwrapping the stack by returning to the subsystem thereby allowing the subsystem to return to the client, the client completing processing of the client task after the stack has been unwrapped.

13. The apparatus of claim 12 wherein the client completes the client task by calling a callback function that then completes the client task.

14. The apparatus of claim 13 wherein the stack unwinding mechanism directs the client to call the callback function.

15. The apparatus of claim 12 wherein the stack unwinding mechanism determines by using a flag whether the asynchronous subsystem function completed the subsystem task synchronously.

16. The apparatus of claim 15 wherein the flag is contained in a control block residing in the memory, and wherein the stack unwinding mechanism uses an address of the control block to access the flag.

17. The apparatus of claim 12 wherein the subsystem task is contained in a control block residing in the memory, and wherein the client directs the subsystem to perform the subsystem task by passing an address of the control block to the subsystem.

18. An apparatus comprising:
    a processor coupled to a bus;
    a memory coupled to the bus;
    a stack residing in the memory;
    an asynchronous subsystem function and a client residing in the memory, the client calling the asynchronous subsystem and directing the asynchronous subsystem function to perform a subsystem task as part of performing a client task; and
    a stack unwinding mechanism residing in the memory, the stack unwinding mechanism unwrapping the stack after completion of the subsystem task if the asynchronous subsystem function completed the subsystem task synchronously, the stack unwinding mechanism unwrapping the stack by returning to the client, the client completing processing of the client task after the stack has been unwrapped.

19. A method comprising the steps of:
    a) determining if an asynchronous function completed a first task synchronously; and
    b) unwrapping a stack by returning before completion of a client task if the asynchronous function completed the first task synchronously.

20. The method of claim 19 wherein the step of unwrapping a stack by returning before completion of a client task if the asynchronous function completed the first task synchronously further comprises the step of completing the client task after the stack has been unwrapped.

21. The method of claim 19 wherein the step of determining if an asynchronous function completed a first task synchronously further comprises the step of testing a flag to determine if the asynchronous function completed synchronously.

22. The method of claim 21 further comprising, before the step of determining if an asynchronous function completed a first task synchronously, the step of setting the flag to a particular value that indicates that the asynchronous function will complete asynchronously.

23. The method of claim 21 wherein the step of testing a flag to determine if the asynchronous function completed a first task synchronously further comprises the step of accessing a control block to retrieve the flag.

24. The method of claim 20 wherein the step of completing the client task after the stack has been unwrapped further comprises calling a callback function that completes the client task.

25. A method for reducing stack overflow in a computer system using the call/callback model, the computer system comprising a stack, a client, and an asynchronous subsystem function, the method comprising the steps of:
   a) the client directing the subsystem to perform a subsystem task as part of a client task;
   b) determining if the asynchronous subsystem function completed the subsystem task synchronously; and
   c) performing the following steps if the asynchronous subsystem function completed synchronously:
      i) unwrapping the stack by returning before completion of the client task; and
      ii) completing the client task after the stack has been unwrapped.

26. The method of claim 25 wherein the step of determining if the asynchronous subsystem function completed a subsystem task synchronously further comprises the step of testing a flag to determine if the asynchronous subsystem function completed synchronously.

27. The method of claim 26 further comprising, before the step of determining if the asynchronous subsystem function completed a subsystem task synchronously, the step of setting the flag to a particular value that indicates that the asynchronous subsystem function will complete asynchronously.

28. The method of claim 26 wherein the step of the step of testing a flag to determine if the asynchronous subsystem function completed synchronously further comprises the step of accessing a control block to retrieve the flag.

29. The method of claim 25 wherein the computer system further comprises a direct access storage device and a memory, at least part of the stack and all of the asynchronous subsystem function and the client being stored in the memory, wherein the stack is infinite, and wherein part of the stack can be stored on the direct access storage device.

30. The method of claim 25 wherein the client further comprises a callback function and wherein the step of completing the client task after the stack has been unwrapped further comprises calling the callback function that completes the client task.

31. A method for reducing stack overflow in a multi-threaded computer system using the call/callback model, the computer system comprising a callback function, a client, and a subsystem, the method comprising the steps of:
   a) the client performing the following steps:
      i) setting a flag to a first value;
      ii) calling the subsystem, directing the subsystem to complete a subsystem task as part of a client task;
      iii) determining if the flag is the first value;
      iv) setting the flag to a second value if the flag is the first value; and
      v) calling a callback function if the flag is not the first value;
   b) the subsystem performing the following steps:
      i) determining if the subsystem task can be completed in a first thread; and
   c) the callback function performing the following steps:
      i) determining if the flag is the first value; and
      iii) completing the client task if the flag is not the first value.

32. The method of claim 31 wherein the client performs the step of setting the flag to the second value if the flag is the first value, and the subsystem performs the step of calling the callback function if the subsystem task can be completed in the first thread.

33. The method of claim 31 wherein the subsystem performs the step of setting the flag to the second value if the subsystem task can be completed in the first thread.

34. The method of claim 31 further comprising the step of running the subsystem in another thread if the subsystem could not complete the subsystem task in the first thread.

35. A computer-readable medium having a program product for reducing stack overflow in a multi-threaded computer, said program product comprising:
   a stack unwinding mechanism unwrapping a stack by returning before completion of a client task if an asynchronous function completed a second task synchronously; and
   signal bearing media bearing the stack unwinding mechanism.

36. The program product of claim 35 wherein the signal bearing media comprises transmission media.

37. The program product of claim 35 wherein the signal bearing media comprises recordable media.

38. The program product of claim 35 wherein a client calls the asynchronous function and wherein the stack unwinding mechanism unwraps the stack by returning to the client from the asynchronous function if the asynchronous function completed the second task synchronously.

39. The program product of claim 35 wherein the stack is at least partially present in memory.

40. The program product of claim 35 wherein the asynchronous function is part of a subsystem.

41. The program product of claim 35 wherein the second task must be completed as part of the client task.

42. The program product of claim 35 wherein the client completes the client task after the stack has been unwrapped.

43. The program product of claim 41 wherein the client completes the client task by calling a callback function that then completes the client task.

44. The program product of claim 42 wherein the stack unwinding mechanism directs the client to call the callback function after the stack unwinding mechanism has unwrapped the stack.

45. The program product of claim 35 wherein the stack unwinding mechanism determines by using a flag whether the asynchronous function completed the second task synchronously.

46. The program product of claim 44 wherein the flag is contained in a control block residing in the memory, and wherein the stack unwinding mechanism uses an address of the control block to access the flag.

47. The program product of claim 39 wherein the second task is contained in a control block residing in the memory, and wherein the client directs the subsystem to perform the second task by passing an address of the control block to the subsystem.

48. A program product comprising:
   a stack unwinding mechanism unwrapping a stack before completion of a client task if an asynchronous subsystem function completed a subsystem task synchronously, the stack unwinding mechanism unwrapping the stack by returning to a subsystem thereby allowing the subsystem to return to a client, the client completing processing of the client task after the stack has been unwrapped; and
   signal bearing media bearing the stack unwinding mechanism.

49. The program product of claim 47 wherein the signal bearing media comprises transmission media.

50. The program product of claim 47 wherein the signal bearing media comprises recordable media.

51. The program product of claim 47 wherein the client completes the client task by calling a callback function that then completes the client task.

52. The program product of claim 50 wherein the stack unwinding mechanism directs the client to call the callback function.

53. The program product of claim 50 wherein the stack unwinding mechanism determines by using a flag whether the asynchronous subsystem function completed the subsystem task synchronously.

54. The program product of claim 52 wherein the flag is contained in a control block residing in the memory, and wherein the stack unwinding mechanism uses an address of the control block to access the flag.

55. The program product of claim 50 wherein the subsystem task is contained in a control block residing in the memory, and wherein the client directs the subsystem to perform the subsystem task by passing an address of the control block to the subsystem.

* * * * *